(12) United States Patent
Putt et al.

(10) Patent No.: US 6,387,553 B1
(45) Date of Patent: May 14, 2002

(54) PULSE BATTERY HAVING AN ELECTRODE WITH AT LEAST TWO ELECTROACTIVE MATERIALS

(75) Inventors: Ronald A. Putt, Auburn, AL (US); Menachem Givon, Hanegev; Jonathan Goldstein, Jerusalem, both of (IL)

(73) Assignee: Electric Fuel Limited, Bet Shemesh (IL)

( * ) Notice: Subject to any disclaimer, the term of this patent is extended or adjusted under 35 U.S.C. 154(b) by 0 days.

(21) Appl. No.: 09/201,524

(22) Filed: Nov. 30, 1998

(30) Foreign Application Priority Data

Dec. 2, 1997 (IL) .................................................. 122416

(51) Int. Cl.[7] .............................................. H01M 4/00
(52) U.S. Cl. ............................................. 429/3; 320/21
(58) Field of Search .................. 320/21, 139; 429/122, 429/3, 9

(56) References Cited

U.S. PATENT DOCUMENTS

| | | | | |
|---|---|---|---|---|
| 5,614,805 A | * | 3/1997 | Momotani et al. | ............ 320/21 |
| 5,849,426 A | * | 12/1998 | Thomas et al. | ................ 429/7 |
| 5,935,728 A | * | 8/1999 | Spillman et al. | .............. 429/94 |
| 6,117,585 A | * | 9/2000 | Anani et al. | ................. 429/122 |

* cited by examiner

*Primary Examiner*—Stephen Kalafut
*Assistant Examiner*—M. Wills
(74) *Attorney, Agent, or Firm*—Lyon & Lyon LLP

(57) ABSTRACT

A battery power supply has a primary battery to provide long service life and a secondary battery to provide short instantaneous power pulses required by loads with variable duty cycles and puslatile load profiles such as digital cellular phones. The primary battery is linked to the power pulse battery in parallel and in series to the load. In the pulse battery, one of the electrodes has at least two electroactive materials as components of the same electrode. These different electroactive materials are selected to have different discharge potentials, charging potentials, and voltage outputs. One of the materials provides a voltage output of a predetermined level and the other of the materials lowers the overall charging voltage of the electrode below that of the first material. The mixed electrode in the pulse battery permits the pulse battery to be charged by the primary battery during the off-pulse periods throughout a substantial portion of the entire discharge voltage range of the primary battery. Thus, the primary battery is not required to provide very tight voltage ranges over its discharge cycle or history during operation with a pulsatile load. The primary battery may be a zinc-air battery.

11 Claims, 3 Drawing Sheets

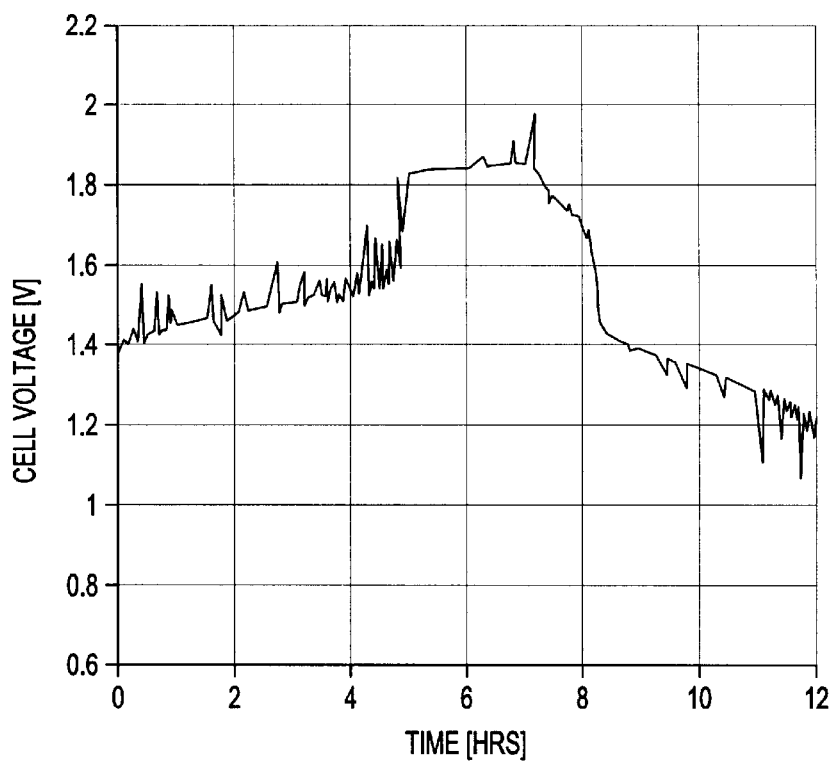
FIG. 5
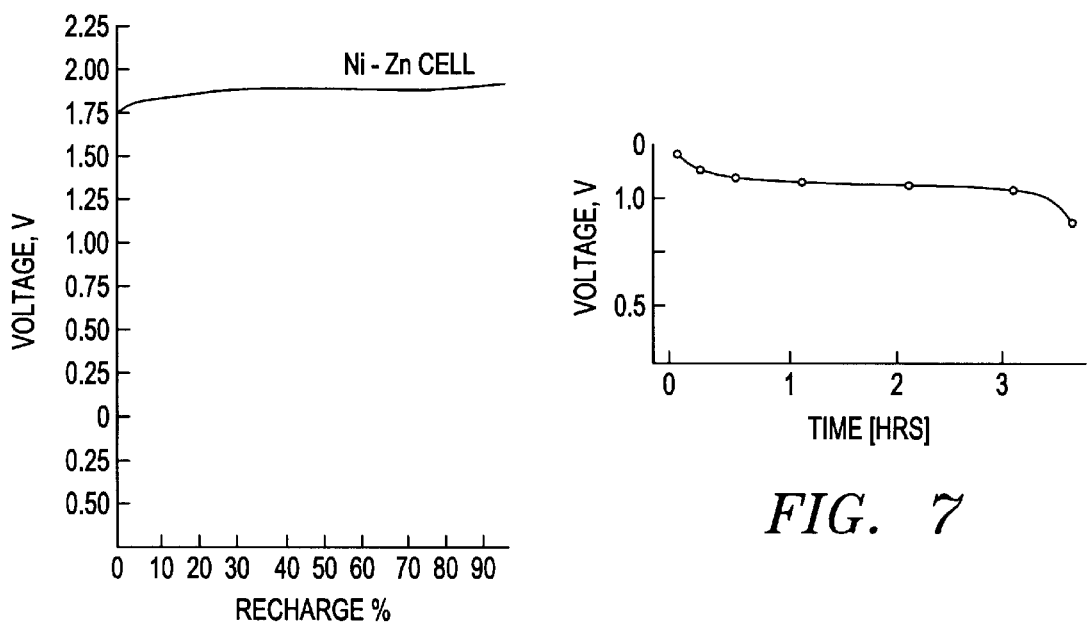
FIG. 6
FIG. 7

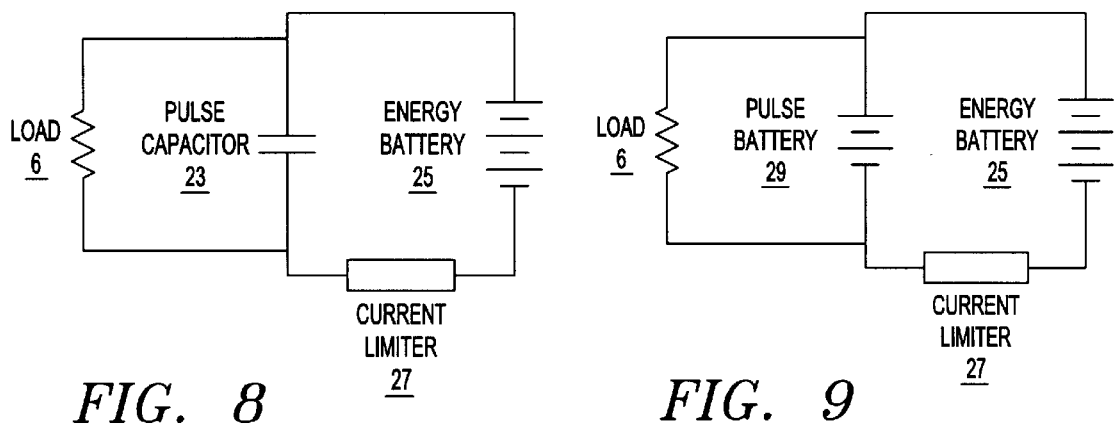
FIG. 8
FIG. 9
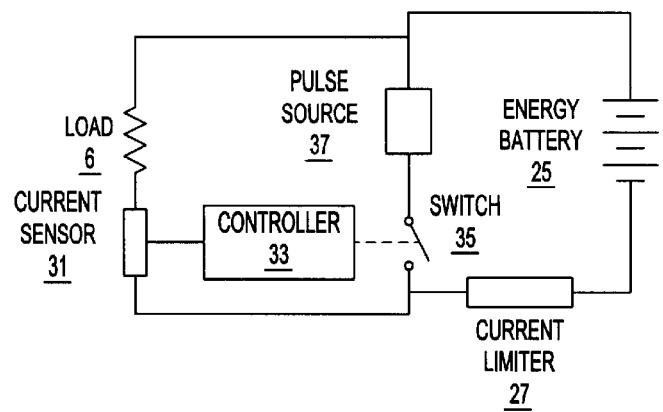
FIG. 10
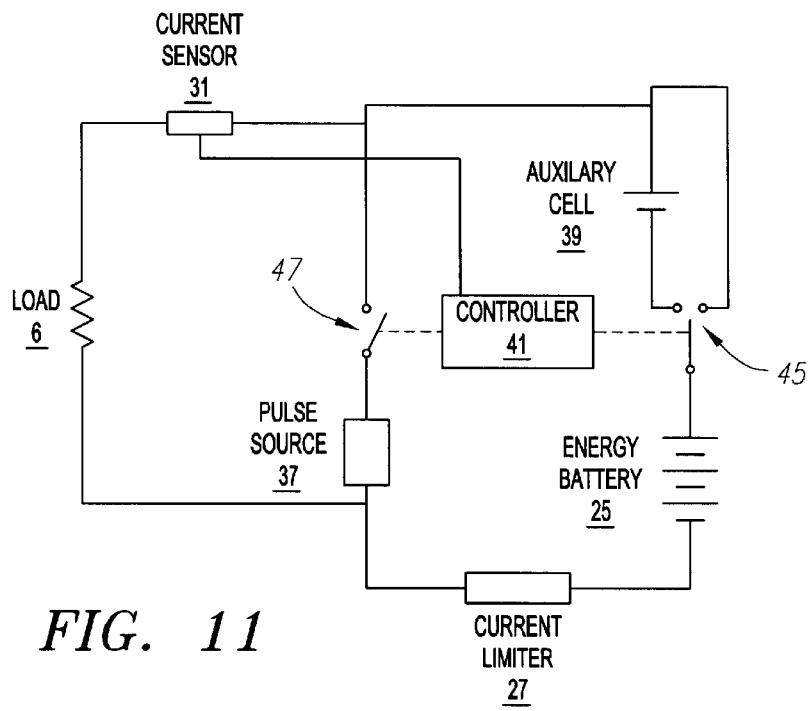
FIG. 11

PULSE BATTERY HAVING AN ELECTRODE WITH AT LEAST TWO ELECTROACTIVE MATERIALS

BACKGROUND

The present invention relates to a battery power supply. More particularly, the present invention relates to a battery power supply capable of providing high current for limited periods of time to satisfy the power demands of loads that create such demands.

Many modern digital devices, such as digital cell telephones, require from a battery high total energy, periodic bursts of power, and moderate average power. Some of these devices require batteries which, at least part of the time, must supply current and power ("power pulses") far in excess of the average current and power used in the device's operating cycle. As the battery discharges, its internal resistance increases, and it becomes increasingly difficult for the battery to provide the required power pulses at an acceptable voltage. In some environments, such as low temperature environments, even a new battery has an insufficient operating voltage to supply the power pulses. For one example, this is particularly true of zinc-air batteries. The sluggish gas phase oxygen reduction reaction, with its high overvoltage at the air cathode, has a poorer pulse voltage response than conventional high-power, solid phase, positive electrodes such as nickel hydroxide and silver oxide.

With the increased use of digital systems, power pulses and the problems associated with them have multiplied. Digital systems vary in their power requirements; some require power spikes of 5 amps for 20 msec and 10 Hz, while others have narrower pulses with lower power/current requirements and frequencies in the 200 Hz range. The duty cycle for GSM (General Systems Mobile) in one particular cellular phone application has a pulse of approximately 0.5 msec, and a peak current of 1.42 amps, which must be supplied at 6 volts. It has an average current of 0.22 amps over a period of approximately 4.6 msec. The total duty cycle is about 5.1 msecs.

SUMMARY OF THE INVENTION

A battery power source employs a pulse battery with one of the electrodes of the pulse battery having at least two electroactive materials as components of the same electrode. These different electroactive materials are selected to have different discharge potentials, charging potentials, and voltage outputs. One of the materials provides a voltage output of a predetermined level and the other of the materials lowers the overall charging voltage of the electrode below that of the first material. Preferably, the second material is present in an amount of at least 5 weight percent. In an embodiment, the negative electrode has at least two electroactive materials as components of the same electrode. The materials may be selected from the group consisting of zinc, gallium, tin, cadmium, lead, indium, bismuth and metal hydrides.

The battery power source is particularly suited to application in a power supply in which an auxiliary pulse battery backs up a battery that supplies the high total energy and average power requirement. The auxiliary battery supplies power to satisfy the demands of circuits requiring pulsed energy discharges on the order of a few milliseconds.

A mixed electrode is a battery electrode with at least two electroactive independent materials in the same electrode. The mixed electrode in the pulse battery permits the pulse battery to charge during the off-pulse periods throughout a substantial portion of the entire discharge voltage range of a primary battery. Thus, the primary battery is not required to provide very tight voltage ranges over its discharge cycle or history during operation with a pulsatile load (characterized by a temporally non-uniform load). For example, the primary battery (or "energy battery") may be a zinc-air battery. The primary battery should be sized and selected such that it supplies most of the energy when the two are connected in parallel.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

BRIEF DESCRIPTION OF THE FIGURES

FIG. 5 is a graphic representation of the experimentally determined charge/discharge curves of a Ni—Zn/Sn mixed electrode cell.

FIG. 6 is a literature-reported Ni—Zn charge curve.

FIG. 7 is a literature-reported Ni—Zn discharge curve.

FIG. 8 is a schematic of a circuit that includes a current limiter and an alternative (capacitive) source to satisfy the pulse demand of the load.

FIG. 9 is a schematic of a circuit that includes a current limiter in the pulse battery circuit of FIG. 1.

FIG. 10 is a schematic of the circuit of FIG. 8 with a control and switch to disconnect the pulse source (in this case a capacitor) when the average or instantaneous (depending on the application) current detected is below a threshold as during the standby mode of a cellular phone.

FIG. 11 is a schematic of a circuit similar to that of FIG. 10 with a selectively switchable auxiliary cell that provides for high power operating mode.

DETAILED DESCRIPTION OF THE EMBODIMENTS

Figure 1:
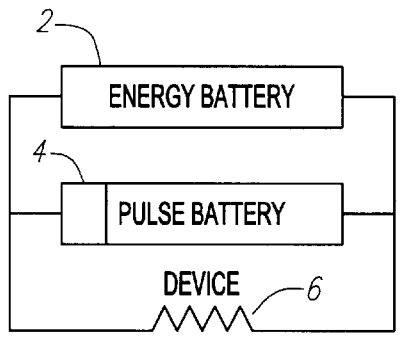
FIG. 1 is a block diagram of a device connected to a pulse battery of the present invention.

Referring to FIG. 1 a circuit contains, among other elements, an energy battery 2 connected in parallel to a pulse battery 4 and in parallel to a device 6 powered by the batteries. The mixed electrode pulse battery shown in the figure can also be used in stand-alone capacitor applications.

The energy battery may be a primary or secondary battery (the term primary referring to a battery that is not recharged and the term secondary referring to a battery that is recharged), including, but not limited to, zinc-air and other metal-air batteries. Preferred electroactive materials for incorporation in the present pulse battery mixed electrodes include, but are not limited to, zinc, gallium, tin, cadmium, lead, indium, bismuth, and metal hydrides among alkaline system negatives. These can be combined with a convention positive electrode, such as nickel hydroxide, manganese dioxide, silver oxide and mercury oxide among alkaline positives. In this list, there have been included electrodes that have good power characteristics and a reasonable degree of electrochemical reversibility. Some candidates, such as cadmium negatives and mercury oxide positives, may be of restricted use on the basis of ecological or regulatory considerations. Similarly, some candidates such as zinc/metal hydride are electrochemically incompatible because of self-discharge. Note that while this invention has been described in terms of a mixed negative electrode, in principle, a mixed positive electrode can also be used for the same objectives.

Preferred mixed negative electrodes for the negative include, but are not necessarily limited to, zinc/tin, zinc/lead, zinc/indium/ zinc/indium/bismuth, tin/lead, or metal hydride/lead while mixed positive electrodes include, but are not limited to, nickel hydroxide/manganese dioxide or silver oxide/manganese dioxide.

Since the electrodes of the present invention are intended for use in an alkaline electrolyte system, selection of suitable mixed electrode components is based partly on their standard potentials in KOH. (See Table 1).

TABLE 1

| Negatives (V) | | Positives (V) | |
|---|---|---|---|
| Zn/ZnO | −1.25 | $AgO/Ag_2O$ | +0.59 |
| $Ga/Ga(OH)_4$ | −1.22 | $NiOOH/Ni(OH)_2$ | +0.49 |
| $In/In(OH)_3$ | −1.00 | $Ag_2O/Ag$ | +0.36 |
| $Sn/Sn(OH)_4^{2-}$ | −0.91 | $MnO_2/Mn_2O_3$ | +0.27 |
| MH(hydride)/M | −0.83 | $PbO_2/PbO$ | +0.25 |
| $Cd/Cd(OH)_2$ | −0.81 | HgO/Hg | +0.1 |
| $Pb/Pb(OH)_4^{2-}$ | −0.58 | | |
| $Bi/Bi_2O_3$ | −0.46 | | |

It is also possible to use three or more components in a mixed electrode. It is expected that at least 5 weight percent of the second or additional electrode component(s) would be needed to produce an electrochemically functioning mixed electrode. This is a difference between the composition of a pulse battery mixed electrode and the composition of normal alloyed electrodes. In the latter, alloying additives are introduced for corrosion inhibition, mechanical/structural reasons or as an end of charge/discharge indicator and are usually present in amounts significantly less than 5 weight percent.

In embodiments of the invention, where the electrode has two electroactive materials, the materials are preferably present in a ratio, with respect to each other, lying between about 30:70 and about 70:30 weight percent. It is preferable that the materials be present in a ratio, with respect to each other, lying between about 40:60 and 60:40 weight percent.

Several factors determine the pulse battery mixed electrodes best suited for a given application. The open circuit voltage (OCV) and loaded circuit voltage of the energy battery and the duration of the current required for the system's power spike, all limit the pulse battery electrode options for a given circuit. Depending on the OCV and loaded circuit voltage of a given energy battery, there is a well-defined voltage window with which to charge the pulse battery during the off-pulse periods in the duty cycle. The pulse battery electrode combination (chemistry) and capacity, as well as the number of cells required, are selected based on the energy battery's performance characteristics and the pulse discharge regime.

Cost is also a determinant in choosing the pulse battery electrodes, since many current digital applications are throw-away applications, requiring cheap energy sources usually excluding capacitors and supercapacitors. It must be borne in mind that capacitors may be undesirable as energy storage pulse source devices because of the expense, size, and weight required of many pulsed applications.

In principle, the energy battery may contain one or several cells connected in series to form a single battery. The energy battery is connected in parallel with the pulse battery, which itself may consist of one or more cells in series.

Figure 2:
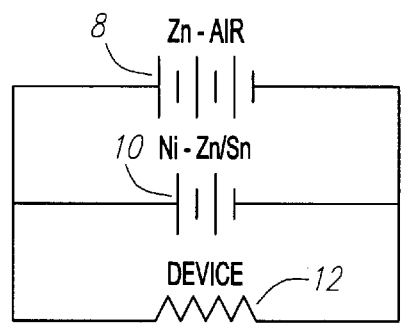
FIG. 2 is a block diagram of a device connected to a specific pulse battery of the present invention.

Referring now to FIG. 2, a circuit suitable for a device requiring a 3 V pulse may require three zinc-air batteries 8 wired in series and connected in parallel to two nickel-zinc/ tin pulse batteries 10. The pulse batteries 10 are also wired in series and connected in parallel to device 12. The nickel positive electrode in the above Ni/Zn/Sn cell (and everywhere else in this application where Ni—Zn and Ni—Zn/Sn cells are mentioned) should be understood as referring to the $NiOOH/Ni(OH)_2$ electrode.

TABLE 2

| | Single Cell | | Multiple Cells | | |
|---|---|---|---|---|---|
| | Typical OCV | Average CCV | Typical OCV | Average CCV | Number of Cells |
| Zinc-air* | 1.45 V | 1.15 V | 4.35 V | 3.45 V | 3 |
| Zinc-air** | 1.45 V | 1.05 V | 4.35 V | 3.15 V | 3 |
| Nickel-Zinc | 1.85 V | 1.65 V | 3.70 V | 3.30 V | 2 |
| Nickel-Zinc/tin | 1.4–1.85 V | 1.50 V | 3.70 V | 3.00 V | 2 |

*First half of discharge
**Second half of discharge

Because the zinc-air multiple cell OCV and closed circuit voltage (CCV) generally exceed the pulse battery multiple cell OCV and CCV, the pulse battery is chargeable by the energy batter. However, towards the later stages of the energy battery's discharge, a nickel-zinc couple alone may not be chargeable since the zinc-air discharge voltage decreases with time. (See Table 2.) To circumvent this difficulty, e.g. in the case of nickel-zinc, the present invention provides for the use of a mixed zinc-based, negative electrode in the pulse battery, where the negative electrode includes zinc and a metal having a lower discharge potential and a lower charging potential than zinc. One such suitable metal is tin. This second component lowers the pulse battery's charging voltage and allows the pulse battery to produce the required power spikes even in the later stages of the zinc-air energy battery's discharge. This effect is readily observed by comparing the voltage difference between lines 2 and 4, column 5 (3.15 V versus 3.00 V) and lines 2 and 3, column 5 (3.15 V versus 3.30 V) of Table 2.

Figure 3:
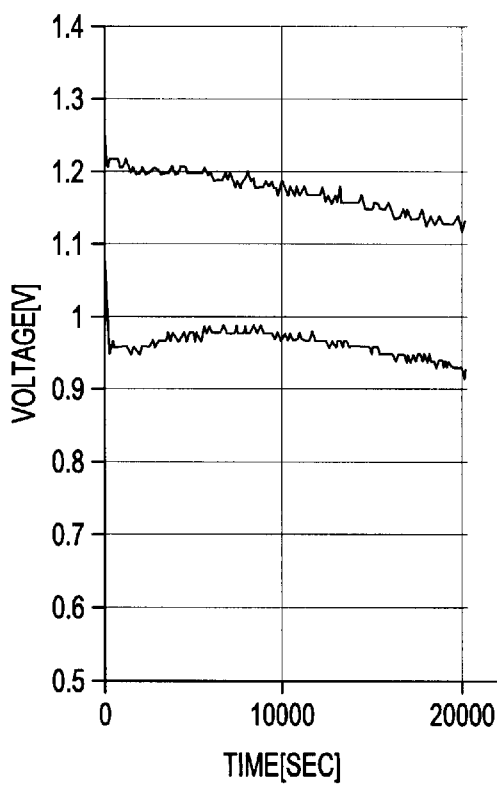
FIG. 3 is a graphic representation of a zinc-air cell voltage versus time curve when Ni—Zn/Sn pulse battery is present in the circuit.
Figure 4:
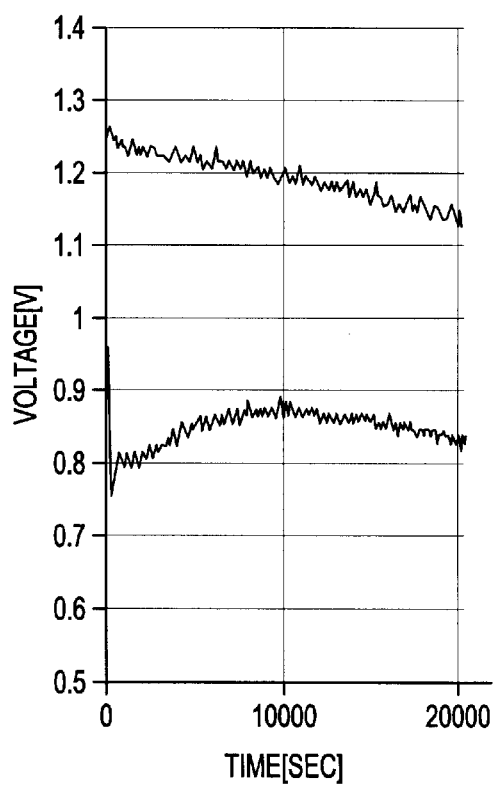
FIG. 4 is a graphic representation of a zinc-air cell voltage versus time curve when Ni—Zn/Sn pulse battery is absent from the circuit.

As an example of the effect of a functioning mixed electrode pulse battery, a mixed negative electrode (Zn/Sn) was coupled to a standard nickel positive electrode and two such series-connected cells connected in parallel to a three cell series-connected zinc-air energy battery. The circuit was designed to maintain at least a constant voltage above 0.9 V for each zinc-air cell. The Zn/Sn ratio was 1:1 by weight. The zinc-air battery was discharged for 20000 seconds at 3 A and voltage across one of the zinc-air cells was measured over time to produce a voltage-time curve. As is readily apparent from the lower curve in FIG. 3, the mixed electrode battery consistently helps to maintain a voltage in excess of 0.9 V per zinc-air cell. A control circuit without a mixed electrode pulse battery (FIG. 4) never attains a voltage of 0.9 V. In both FIGS. 3 and 4, the upper curves represent the circuit discharging at 0.87 A while the lower curves represent discharge at 3 A. At the higher current (the lower curves), the effects on voltage resulting from the use of the pulse battery become more readily apparent.

When using a mixed negative electrode, the electrode has a mixed potential for both charge and discharge. The voltage versus time charge/discharge curves for a mixed electrode in a pulse battery do not necessarily exhibit two discrete plateaus with a well-defined "knee." There may be a gradually increasing curve on charging and a gradually decreasing curve on discharge, depending on the nature of the couples involved and the concentrations of the elements present.

The following experiment illustrates charge voltage lowering obtained with a Ni—Zn/Sn pulse battery.

A zinc/tin electrode was prepared by blending 15 g SnO, 15 g ZnO, 2 g T-30 PTFE emulsion, 0.6 g cellulose fiber and 145 g water in a mixer for 5 minutes. A portion of the mixture (45 g) was withdrawn, filtered and oven dried at 80° C. for about one hour. The filtered material was pressed onto a tin-plated, copper screen at a pressure of about 2 metric tons per square inch and the electrode produced was about 0.25 mm thick.

The Zn/Sn electrode was cut into 2.5 cm×5 cm sections and a nickel positive electrode from a Varta AA Ni—Cd cell was cut into similar size pieces. Sections of cellulose and Freudenberg FS2183 separator paper were cut into 3 cm×6 cm pieces and wetted with 10 M KOH. The Zn/Sn electrode, cellulose, Freudenberg separator paper and Ni positive electrode pieces were stacked and placed in a 5 cm×6 cm polyethylene pouch. Electrolyte was added to the pouch to saturate the electrode and separator paper. The entire assembled pouch was clamped between two acrylic plates with four screws until finger tight. The test pulse cell was charged at 50 mA until the voltage reached 1.95 V, followed by OC rest for one minute, and then discharged at 50 mA until the voltage reached 1.0 V.

From FIG. 5, it is readily apparent that the tin portion of the electrode reached a voltage in excess of 1.8 V after charging for about 5 hours. For most of that period, the voltage plateaued in the range of 1.4–1.55 V. From about 5 to 7 hours after charging began, a second charging plateau, that of zinc, appeared at approximately 1.8–1.85 V. Similarly, at the initial stages of discharge (7 to 8.5 hours in FIG. 5), a zinc discharge plateau appeared at 1.5–1.85 V. Further into the discharge (from 8.5 to 12 hours in FIG. 5), the tin discharge plateau appeared between 1.2–1.4 V. Note that the x-axis in FIG. 5 shows time as measured from the beginning of the charging process, and as a result, discharge began approximately 7 hours after charging.

In FIGS. 6 & 7, charge and discharge curves from the literature are shown for regular Ni—Zn cells (i.e. without added tin). The voltage ranges of these curves and the plateaus in FIG. 5 show that the Ni—Zn/Sn test cell operated at regular nickel-zinc voltages only at the end of the charging and at the beginning of the discharging stages. At these stages, there is effectively no active, operating, electrochemical tin. At other stages of the charging/discharging processes, the tin reaction is operative. The test pulse cell's voltage is then lower than a regular Ni—Zn cell, making extended charging by a zinc-air energy battery possible.

To maximize power and minimize weight and volume for many battery applications, it is preferable that the battery be of a flat pack, thin plate design either as a single cell, series-connected multiple cells, or in bipolar connection. It may have only the minimum capacity (in mAh) required for providing with the given pulse regime and a satisfactory rate capability for charge acceptance. A flat design allows for maximum electrode area and current delivery capability for given weight and volume constraints. This design permits a smaller, less bulky auxiliary pulse battery pack for use in today's compact cellular phones, pagers, etc. All the recommended multielemental electrodes described above can be prepared in very thin, large area configurations and have a reasonable degree of electrochemical rechargeability.

Referring to FIG. 8 an energy battery 25, a pulse capacitor 23 interconnected in parallel are connected in series with the load 6 as shown. This is the configuration of FIG. 1 except that a capacitor is used to store charge from the energy battery instead of a pulse batter. In this configuration, when a load spike occurs, the capacitor discharges to satisfy the load. After the capacitor discharges, the energy battery 25, automatically charges the capacitor. To prevent the capacitor from drawing down the voltage of the energy battery (so to insure the maintenance of a required operating voltage of the equipment being supplied) a current limiter is connected in series between the energy battery 25 and the pulse capacitor 23. The current limiter may be of any design suitable for limiting current in a DC circuit without significant dissipation of energy. Referring to FIG. 9, a current limiter may be used with a pulse battery 29 in the configuration of FIG. 1 to insure that the current drain on the primary or energy battery 25 does not draw down the voltage supplied to the load when the pulse battery is charged by the energy battery. The current limiter 27 in this case may not be required depending on the voltage required of the load, the internal resistances of the energy 25 and the pulse 29 batteries, the voltage differences during recharge, etc.

A problem with a pulse configuration such as shown in FIGS. 1, 8 and 9, is that some pulse sources, when connected for long periods, can contribute to accelerated drain on the energy batter. For example, a large capacitance connected to the energy battery can drain the battery over a long period such as when the appliance is not in use or when the appliance is in a mode in which the pulsaltile load is not present. For example, a cellular telephone may be placed in standby mode, a mode in which the phone is available for calls and in which the load is much smaller than the mode in which a call has been established. The cellular telephone may also be shut off. In either case, it may be preferable, for the sake of the longevity of the energy battery 25, for the pulse source to be disconnected from the energy battery.

Referring to FIG. 10, a generalized pulse source 37, is connected in modified versions of the circuits of FIGS. 8 and 9. The pulse source 37 may be any kind of power source capable of supplying the pulse load and rechargeable in some fashion by the primary energy battery 25. A current sensor 31 is connected in series with the load to indicate to a controller the instantaneous or average current. The current sensor 31 may simply be a resistor-voltmeter combination or some other mechanism for measuring current or power instantly, or on-average, consumed by the load 6. The current sensor 31 indicates to a controller 33 the current being demanded by the load 6. In response, the controller opens or closes a switch 35 selectively to connect the pulse source 37. The controller may be a programmable controller that compares a measured current supplied by current sensor 31 to a threshold value stored and programmable in the controller 33. Alternatively the controller may be a simple comparator with a fixed threshold input supplied by a tap from a voltage divider in the circuit. Many different alternatives are available to provide the function of disconnecting the pulse source from the energy battery 25 when the current draw of the load 6 is below a certain predetermined value and to connect it when the load is above the predetermined value. Note also that the controller may be configured to respond to a pulsatile/non-pulsatile current condition. That is, the pulse source 37 would be disconnected when the current is flat or constant (within a specified threshold) and connected when the current is pulsatile with the threshold tolerance. Since the pulsatile condition is the one that requires the pulse source 23, this function would be appropriate also.

In many situations, the average power demand of a load may vary in addition to the situation where the load varies between pulsatile and flat. For example in a cell telephone, when the phone is on standby, the power demand is low and when the phone is in "talk" mode, the average demand is high. In such situations, it may be desirable for the energy battery to have one number of cells to provide the necessary voltage in the standby mode but to have more cells to supply the necessary voltage when the phone is placed in "talk" mode. This would be useful where the average current draw in "talk" mode is higher. In other words, the voltage may require a boost to maintain the minimum voltage during high average current draw. The higher voltage during low demand periods, however, can cause a higher current and power drain than necessary. Thus, it may be desirable to reduce the number of cells in the energy battery during low load periods.

Referring to FIG. 11, the circuit of FIG. 10 is modified to provide a switch that connects an additional cell or cells of an auxiliary battery in series to the energy battery selectively under control of a controller 41 similar to controller 31 of FIG. 10. When the switches 47 and 45 are in a first position under control of controller 41, the pulse source 37 is disconnected and the auxiliary cell 39 bypassed. When the switches 47 and 45 are in a second position, the pulse source 37 is connected in the circuit and the auxiliary cell 39 connected in series with the energy battery 25. The controller 41 may operate according to the same criteria as controller 33 discussed with reference to FIG. 10. The controller 41 may also be constructed as controller 33.

It will be evident to those skilled in the art that the invention is not limited to the details of the foregoing illustrative embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A pulse battery comprising an electrode having at least two electroactive materials as components of the same electrode, wherein said electroactive materials have different discharge potentials, charging potentials and voltage outputs, a first of said materials providing a voltage output of a predetermined level and a second of said materials lowering the overall charging voltage of said electrode below that of said first material, and wherein said second material is present in an amount of at least 5 weight percent.

2. A pulse battery according to claim 1, comprising a negative electrode having at least two electroactive materials as components of the same electrode, said materials being selected from the group consisting of zinc, gallium, tin, cadmium, lead, indium, bismuth and metal hydrides.

3. A pulse battery according to claim 2, wherein said electrode is a mixed electrode having a pair of electroactive materials, said pair being selected from the group consisting of zinc/tin, zinc/lead, zinc/indium, tin/lead and metal hydride/lead.

4. A pulse battery according to claim 2, comprising a positive electrode having at least two electroactive materials as components of the same electrode, said materials being selected from the group consisting of nickel hydroxide, manganese dioxide and silver oxide.

5. A pulse battery according to claim 1, wherein said two electroactive materials are present in a ratio to each other of between 70:30 and 30:70 weight percent.

6. A pulse battery according to claim 1, wherein said two electroactive materials are present in a ratio to each other of between 40:60 and 60:40 weight percent.

7. A pulse battery according to claim 2, in parallel circuit with an energy battery, as herein defined.

8. A pulse battery according to claim 1, wherein said electrode is a mixed electrode comprising at least three electroactive materials.

9. A battery power supply, comprising:

a pulse battery with a mixed electrode having at least two electroactive materials as components of the same electrode, said electroactive materials having different discharge potentials;

an energy battery connected in parallel with said pulse battery;

a circuit formed by said interconnected pulse and energy batteries being connectable to a load such that when said load reaches a first level, said load is satisfied primarily by a power capacity of said energy battery and when said load reaches a second level, said load is satisfied substantially by a contribution by said pulse battery.

10. A power supply as in claim 9, wherein said pulse battery is configured such that it is charged by said energy battery at times when said load is at said first level.

11. A battery power supply, comprising:

a pulse battery with a mixed electrode having at least two electroactive materials as components of the same electrode, said electroactive materials having different charging potentials;

an energy battery connected in parallel with said pulse battery;

a circuit formed by said interconnected pulse and energy batteries being connectable to a load such that when said load reaches a first level, said load is satisfied primarily by a power capacity of said energy battery and when said load reaches a second level, said load is satisfied substantially by a contribution by said pulse battery.

* * * * *